United States Patent

Ahn et al.

Patent Number: 6,079,623
Date of Patent: Jun. 27, 2000

[54] APPARATUS FOR MAPPING MEMORY PCMCIA CARDS INTO I/O WINDOW ADDRESS SPACE TO SELECT AN INTERNAL REGISTER AND PERFORM READ AND WRITE OPERATIONS USING AN INDEX MECHANISM

[75] Inventors: Mun Weon Ahn; Han Heung Kim, both of Kyoungki-do, Rep. of Korea

[73] Assignee: Hyundai Electronics Industries Co., Ltd., Ichon-shi, Rep. of Korea

[21] Appl. No.: 08/965,766

[22] Filed: Nov. 7, 1997

[30] Foreign Application Priority Data

Nov. 7, 1996 [KR] Rep. of Korea ...................... 96-52656

[51] Int. Cl.[7] .................................................. G00K 19/06

[52] U.S. Cl. .......................... 235/492; 710/100; 710/101; 711/1

[58] Field of Search ................................ 235/492; 711/1; 710/100, 101

[56] References Cited

U.S. PATENT DOCUMENTS

| | | | |
|---|---|---|---|
| 5,537,558 | 7/1996 | Fletcher et al. | 395/309 |
| 5,796,981 | 8/1998 | Abudayyeh et al. | 395/500 |
| 5,812,858 | 9/1998 | Nookala et al. | 395/733 |

*Primary Examiner*—Donald Hajec
*Assistant Examiner*—Douglas X. Rodriguez
*Attorney, Agent, or Firm*—Jacobson, Price, Holman & Stern, PLLC

[57] ABSTRACT

An apparatus serves to map internal registers into I/O addresses to select an internal register and perform read and write operations in the I/O address space of the PCMCIA host adapter, using the index mapping mechanism. The apparatus according to the present invention includes a plurality of internal registers for storing an input data, being arranged in the PCMCIA card; a plurality of first AND gates for producing a first control signal in response to index signals from an index register; a plurality of second AND gates for producing a register enabling signal in response to the first control signal and a data write signal from CPU; and a plurality of AND gates means for producing a third control signal outputting data stored in the internal register.

11 Claims, 3 Drawing Sheets

APPARATUS FOR MAPPING MEMORY PCMCIA CARDS INTO I/O WINDOW ADDRESS SPACE TO SELECT AN INTERNAL REGISTER AND PERFORM READ AND WRITE OPERATIONS USING AN INDEX MECHANISM

BACKGROUND OF THE INVENTION

1. Field of the Invention

The present invention relates to computer communications through an interface defined by the standards of the Personal Computer Memory Card International Association (hereinafter, referred to as a PCMCIA) and, more particularly, to an apparatus for mapping memory PCMCIA cards into a I/O address space to select an internal register and perform read and write operations, using the index mapping mechanism.

2. Description of the Related Art

In general, the PCMCIA cards contain attribute memories which are written to or read from host software for control and monitoring of the card's capability. A memory card is used for any purpose that is recognizable by host software, such as system memory, flash memory, or floppy emulation. Memory cards are mapped into the system address space using the windowing technique similar to other prevalent memory expansion schemes. A modem card, for example, would be connected to a system port using I/O window address.

These memory cards are embodied with an internal register and a specific internal register corresponding to input data is indicated. However, to indicate these internal registers and perform write and read operations in high speed, the simplification of configuration has been required.

SUMMARY OF THE INVENTION

It is an object of the present invention to provide an apparatus for mapping internal registers into I/O addresses in the PCMCIA host adapter using an indexing mechanism.

In accordance with an aspect of the present invention, there is provided an apparatus for mapping internal registers, in a PCMCIA card of a computer system, into I/O address space and for performing write and read operations, the apparatus comprising: a plurality of first means for receiving index signals from an index register and generating a first control signal; a plurality of second means for receiving the first control signal from the first means and a data write signal from a CPU of the computer system and generating a second control signal; a plurality of third means for receiving the first control signal from the first means and a data read signal from the CPU of the computer system and generating a third control signal; a plurality of registers for storing an input data in response to the second control signal; and a plurality of fourth means for reading out data stored in the registers in response to the third control signal from the third means.

In accordance with another aspect of the present invention, there is provided an apparatus for selecting one of registers, which are arranged in the indexing mechanism in a PCMCIA card of a computer system, and for performing write and read operations, wherein the PCMCIA card has a plurality of internal registers, a data resister and an index register, the apparatus comprising: a plurality of first means for producing enable signals which enables the internal registers to store an input data from the data register in response to index signals from the index register and a data write control signal from a CPU of the computer system; and a plurality of second means for reading out the stored data in response to the index signals from the index register and a data read control signal from the CPU of the computer system.

BRIEF DESCRIPTION OF THE DRAWINGS

The novel features believed characteristic of the invention, as well as other features and advantages thereof, will best be understood by reference to the following detailed description of a particular embodiment, read in conjunction with the accompanying drawings, wherein.

DETAILED DESCRIPTION OF THE PREFERRED EMBODIMENTS

Hereinafter, the present invention will be described in detail referring to accompany drawings.

Figure 1:
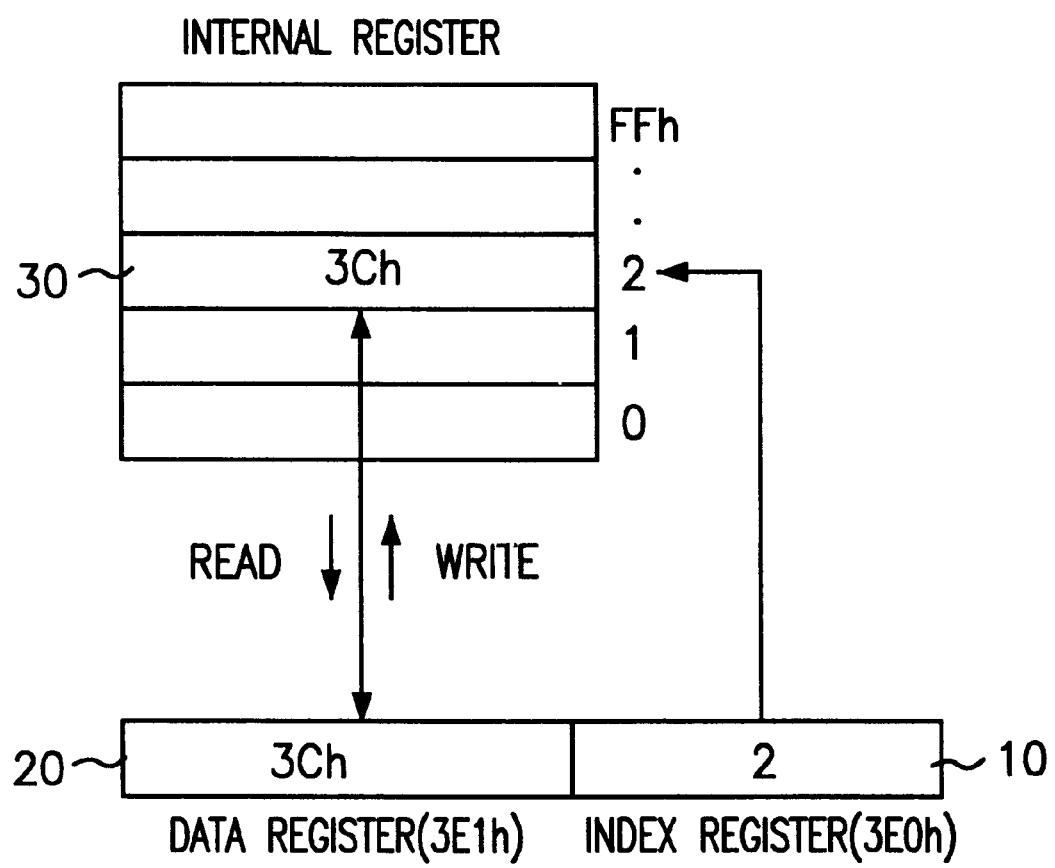
FIG. 1 is a schematic view illustrating a concept of the indexing mechanism according to the present invention.

First, referring to FIG. 1, which is a schematic view illustrating a concept of the indexing mechanism according to the present invention. The indexing mechanism includes a plurality of internal registers, an index register and a data register. The index register indicates one of the internal registers required in a data write operation or a data read operation and the indicated internal register performs a data write or read operations together with the data register. Also, the index register and the data register are respectively defined by I/O addresses from the CPU.

The internal register is indicated by the index register defined by an address 3E0h from the CPU and the indicated internal register is associated with the data register defined by an address 3E1h from the CPU. The index register defined by the address signal 3E0h stores index signals corresponding to the internal register to be accessed and then indicates an internal register corresponding to the stored index signal. The data register defined by the address signal 3E1h performs read/write operations associated with the indicated internal register.

For example, the CPU indicates the index register 10 using an index I/O address 3E0h, by writing the index value of 2 to the index register 10. The index register 10 indicates an internal register 30 corresponding to the index value of 2. The CPU reads the data in the internal register (the reference numeral 3Ch in FIG. 1) or writes data into the internal register 3Ch through the data register 20.

Figure 2:
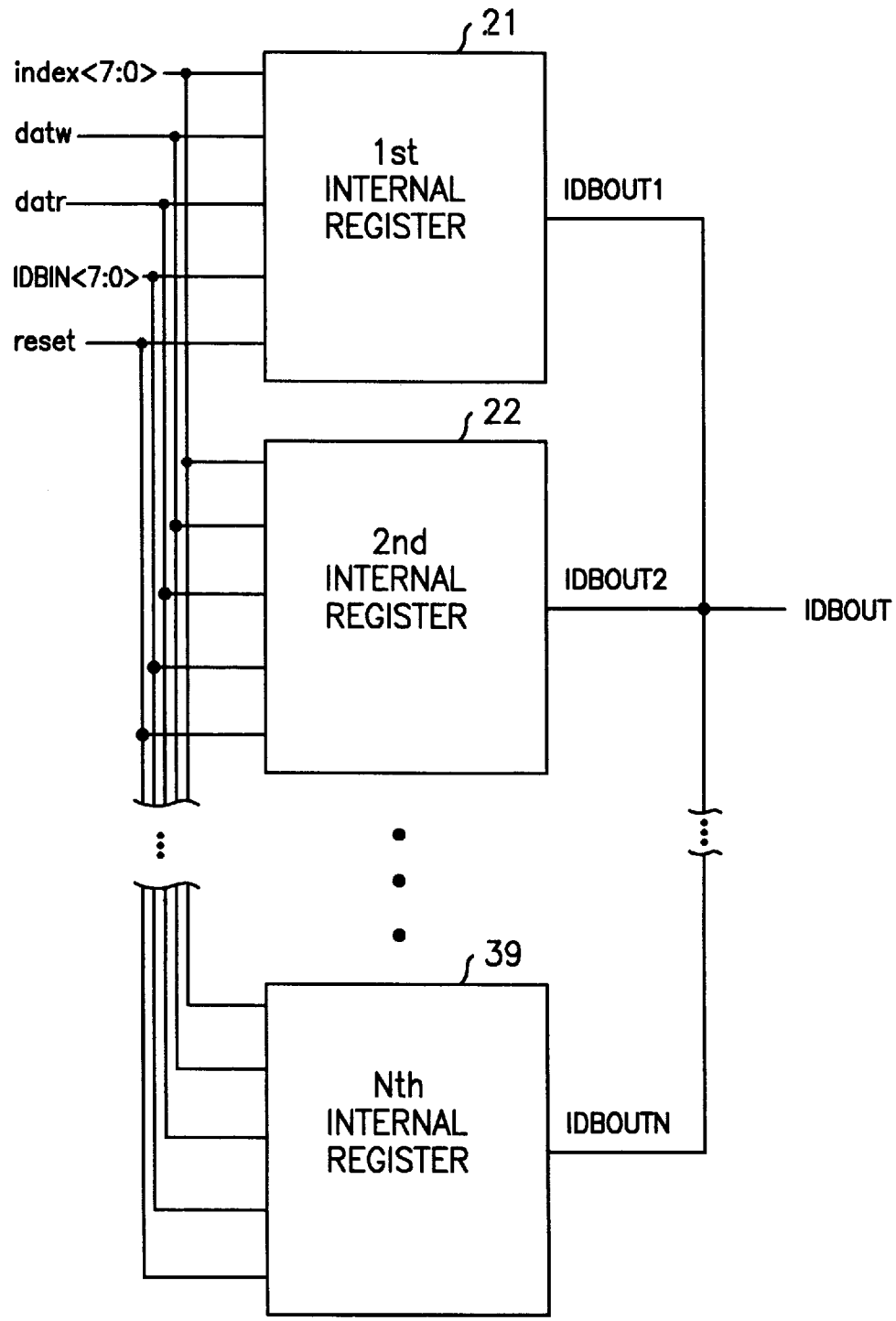
FIG. 2 is a block diagram illustrating an I/O address mapping architecture using the 8-bit indexing mechanism according to the present invention.

Referring to FIG. 2, in which there is shown a block diagram illustrating an I/O address mapping architecture using the 8-bit indexing mechanism according to the present invention, a mapping circuitry according to the present invention includes a plurality of internal registers indicating and data processing blocks (21 to 39), each of which receives index, control, data and reset signals. The control signal is comprised of data write and read signals. Only one internal register is selected by the index signal from the index register activates and then other internal registers can not perform the data write and read operations.

Figure 3:
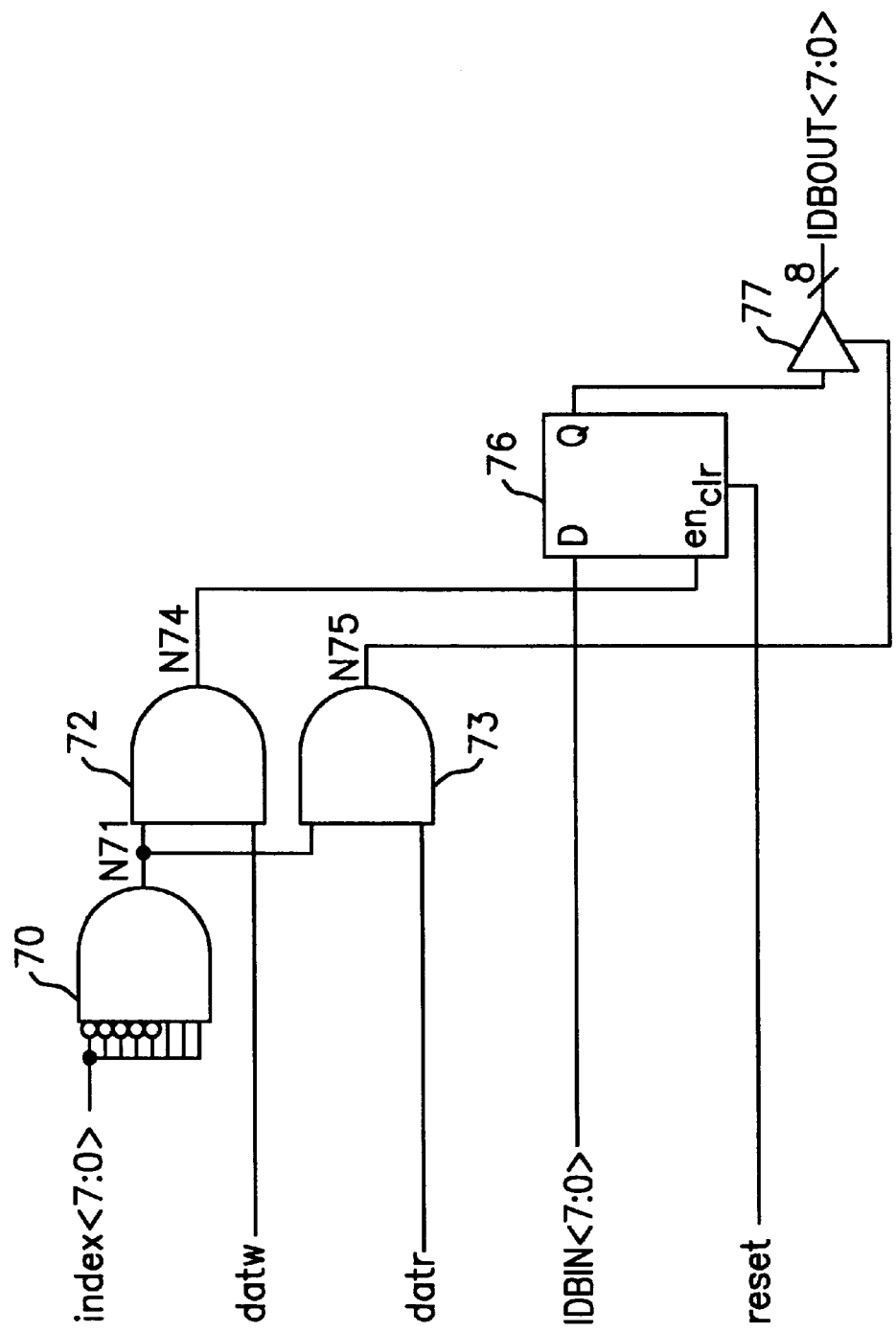
FIG. 3 is a detailed block diagram of a register indicating block of FIG. 2.

Referring now to FIG. 3, in which is shown a detailed block diagram of an internal register of FIG. 2. As shown in FIG. 3, the internal register 21 includes an 8×1 AND gate 70.

The AND gate 70 has inverted and non-inverted input terminals. In particular, the AND gate 70 has five inverted input terminals and three non-inverted input terminals. In other words, even though the internal registers in the I/O address mapping architecture, according to the present invention, receive the same index signal of 8 bits, the outputs of the AND gates are different from one another because of the combination of the inverted input terminals. As a result, it is possible to select only one register corresponding to the input index signal.

Referring again to FIG. 3, when the index value <7:0> from an 8-bit index register is input into the AND gates in all the internal registers 21 to 39, such as a latch circuit, the output of only one AND gate is in a high level. For example, if the output of the AND gate 70 is in a high level in response to the index signals, the internal register 21 is activated. That is, when the logic state at node N71 is in a high level, if an AND gate 72 receives a data write control signal datw, node N74 is in a high level. Accordingly, the AND gate 72 enables a latch circuit 76, such as a D flip-flop, so that data IDBIN is latched.

On the other hand, when the logic state at node N71 is in a high level and an AND gate 73 receives a data read control signal datr, node N75 is in a high level. The latched data is output through a tri-state buffer 77 connected to the output terminal of the latch circuit 76 in response to the output of the AND gate 73. Also, the CPU provides the latch circuit 76 with a reset signal, clearing all internal registers in the 8-bit indexing mechanism according to the present invention.

As apparent from the above description, the I/O address mapping architecture according to the present invention effectively selects a specific register (latch circuit) in I/O address space, using a small number of AND gates. Accordingly, the simplification of configuration is implemented, thereby supporting various I/O cards, such as a fax/modem, SCSI and LAN in high speed.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for mapping internal registers, in a PCMCIA card of a computer system, into I/O address space and for performing write and read operations, the apparatus comprising:

a plurality of first means for receiving index signals from an index register and generating a first control signal;

a plurality of second means for receiving the first control signal from the first means and a data write signal from a CPU of the computer system and generating a second control signal;

a plurality of third means for receiving the first control signal from the first means and a data read signal from the CPU of the computer system and generating a third control signal;

a plurality of registers for storing an input data in response to the second control signal; and a plurality of fourth means for reading out data stored in the registers in response to the third control signal from the third means.

2. The apparatus in accordance with claim 1, wherein the register is a latch circuit.

3. The apparatus in accordance with claim 2, wherein the register is a D flip-flop.

4. The apparatus in accordance with claim 1, wherein the first means comprises:

a plurality of inverting means for inverting the index signals from the index register; and a logic gate for ANDing the inverted index signals and the non-inverted index signals from the index register.

5. The apparatus in accordance with claim 3, wherein the second means is a logic gate for ANDing the first control signal from the first means and a data write signal from the CPU of the computer system.

6. The apparatus in accordance with claim 5, wherein the third means is a logic gate for ANDing th first control signal from the first means and a data read signal from the CPU of the computer system.

7. The apparatus in accordance with claim 1, wherein the fourth means is a tri-state buffer connected to the output terminal of the register.

8. An apparatus for selecting one of registers, which are arranged in the indexing mechanism in a PCMCIA card of a computer system, and for performing write and read operations, wherein the PCMCIA card has a plurality of internal registers, a data resister and an index register, the apparatus comprising:

a plurality of first means for producing enable signals which enables the internal registers to store an input data from the data register in response to index signals from the index register and a data write control signal from a CPU of the computer system; and a plurality of second means for reading out the stored data in response to the index signals from the index register and a data read control signal from the CPU of the computer system.

9. The apparatus in accordance with claim 8, wherein the first means comprises:

a first logic gate activated in response to the index signals from the index register; and a second logic gate receiving an output from the first logic gate and producing an enable signal of the internal register in response to the data write control signal from a CPU of the computer system.

10. The apparatus in accordance with claim 9, wherein the second means comprises:

a tri-state buffer connected to the output terminal of the internal register; and a third logic gate receiving an output from the first logic gate and producing a control signal of the tri-state buffer in response to the data read control signal from the CPU of the computer system.

11. The apparatus in accordance with claim 10, wherein the first to third logic gates are AND gates.

* * * * *